United States Patent
Strawczynski et al.

(10) Patent No.: US 6,381,232 B1
(45) Date of Patent: Apr. 30, 2002

(54) HANDOFF PROCEDURES BASED ON BROADBAND NETWORKS

(75) Inventors: Leo Strawczynski, Ottawa; William A. Gage, Stittsville, both of (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/221,343

(22) Filed: Dec. 28, 1998

(51) Int. Cl.[7] ................................................. H04Q 7/20
(52) U.S. Cl. ....................................... 370/333; 455/442
(58) Field of Search ................................ 370/328, 329, 370/331, 332, 333, 335, 336, 337, 347; 455/436, 437, 438, 439, 440, 441, 442

(56) References Cited

U.S. PATENT DOCUMENTS

| | | | | |
|---|---|---|---|---|
| 5,278,892 A | * | 1/1994 | Bolliger et al. | 370/331 |
| 5,732,347 A | * | 3/1998 | Bartle et al. | 455/421 |
| 6,148,207 A | * | 11/2000 | Baum et al. | 370/332 |
| 6,154,653 A | * | 11/2000 | Jung | 370/331 |
| 6,287,668 B1 | * | 9/2001 | Hayashi et al. | 428/141 |

* cited by examiner

*Primary Examiner*—Ricky Ngo
(74) *Attorney, Agent, or Firm*—Cobrin & Gittes

(57) ABSTRACT

Methods and apparatus are disclosed for improving performance of handoff in a telecommunications system having a plurality of base stations and a mobile unit in handoff communication (uplink only or in both uplink and downlink) with at least two of the base stations over at least first and second respective communications links. The first and second communications links each comprise at least one base station transceiver subsystem (BTS), at least one radio connection controller (RCC), at least one mobile switching center (MSC), and at least one transcoder or data server. The RCC checks whether a given information frame from any of the BTSs is valid. If one or more information frames is valid, then the RCC forwards a valid frame to the transcoder or a data server. If none of the received frames is valid, the RCC then decodes a R=1/n code constructed from data received from the BTSs and checks whether the decoded information frame is valid using a checksum or CRC transmitted with the information frame. If the information frame is valid, it is forwarded to the transcoder or data server. If it is not valid, then the RCC sends either an invalid frame, indicated as such, or a "control" frame indicating an "errored" invalid frame was received.

73 Claims, 6 Drawing Sheets

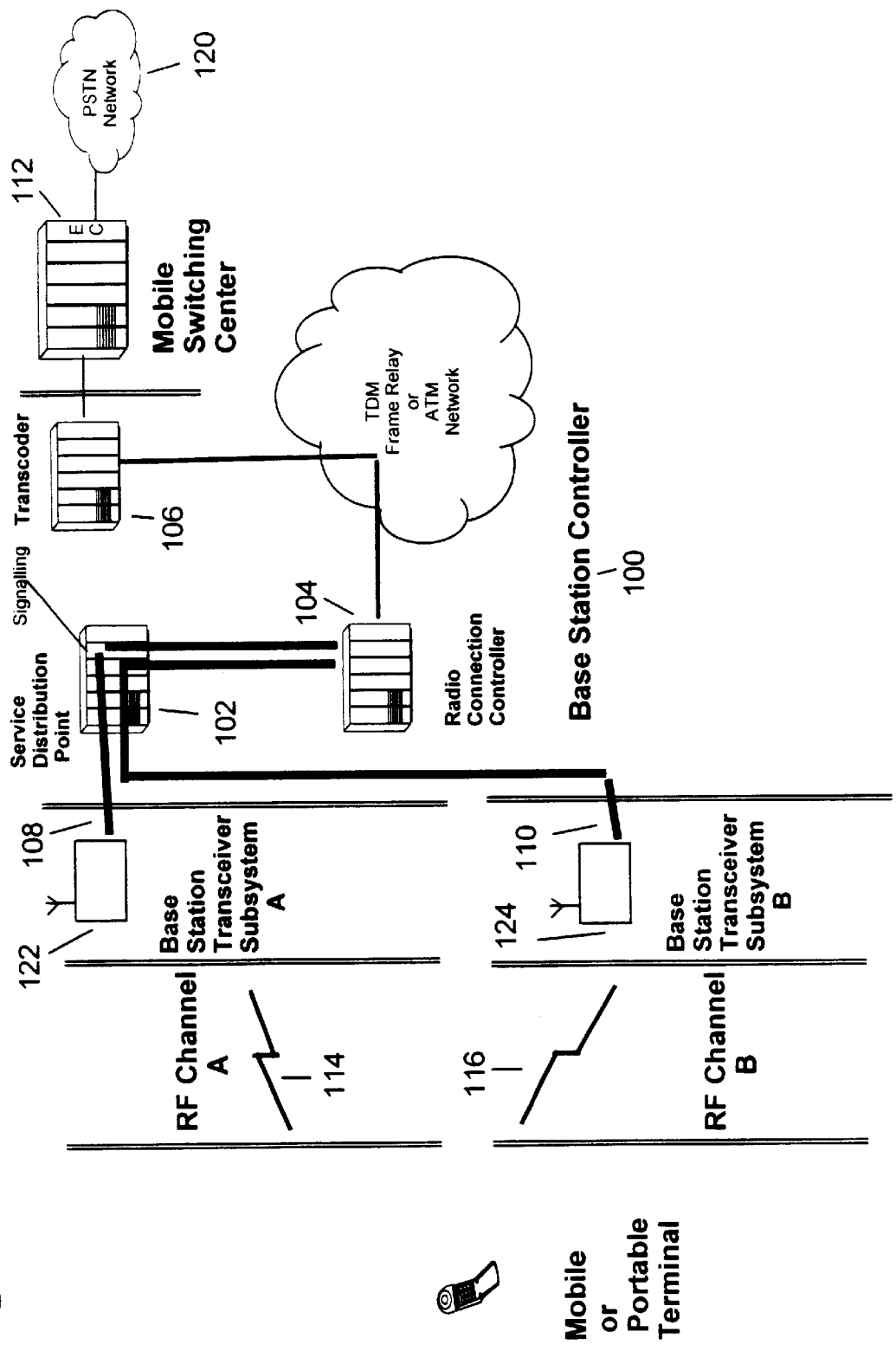
Fig. 1 Intra-BSC Handoff

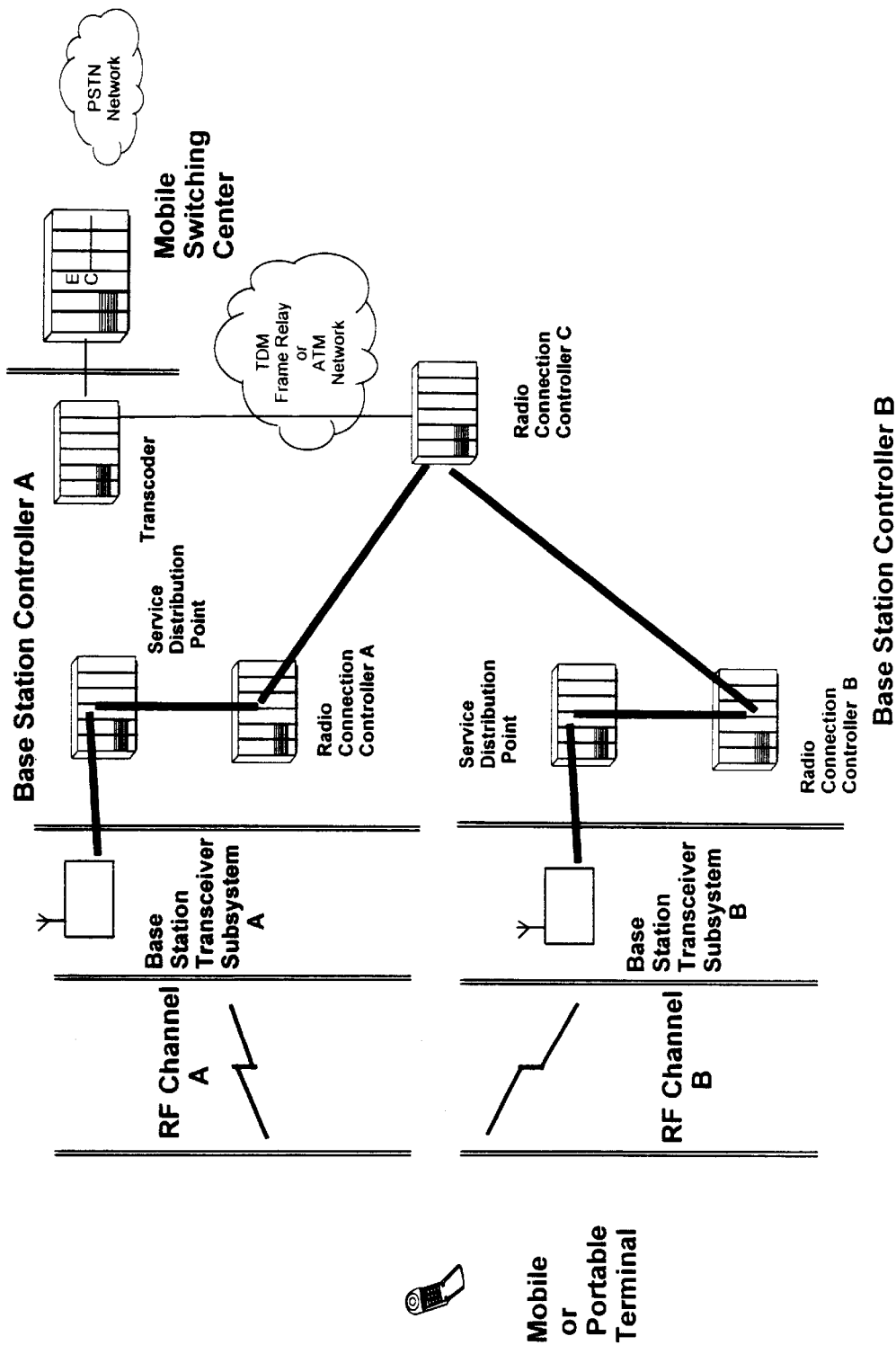
Fig. 2 Inter-BSC Handoff

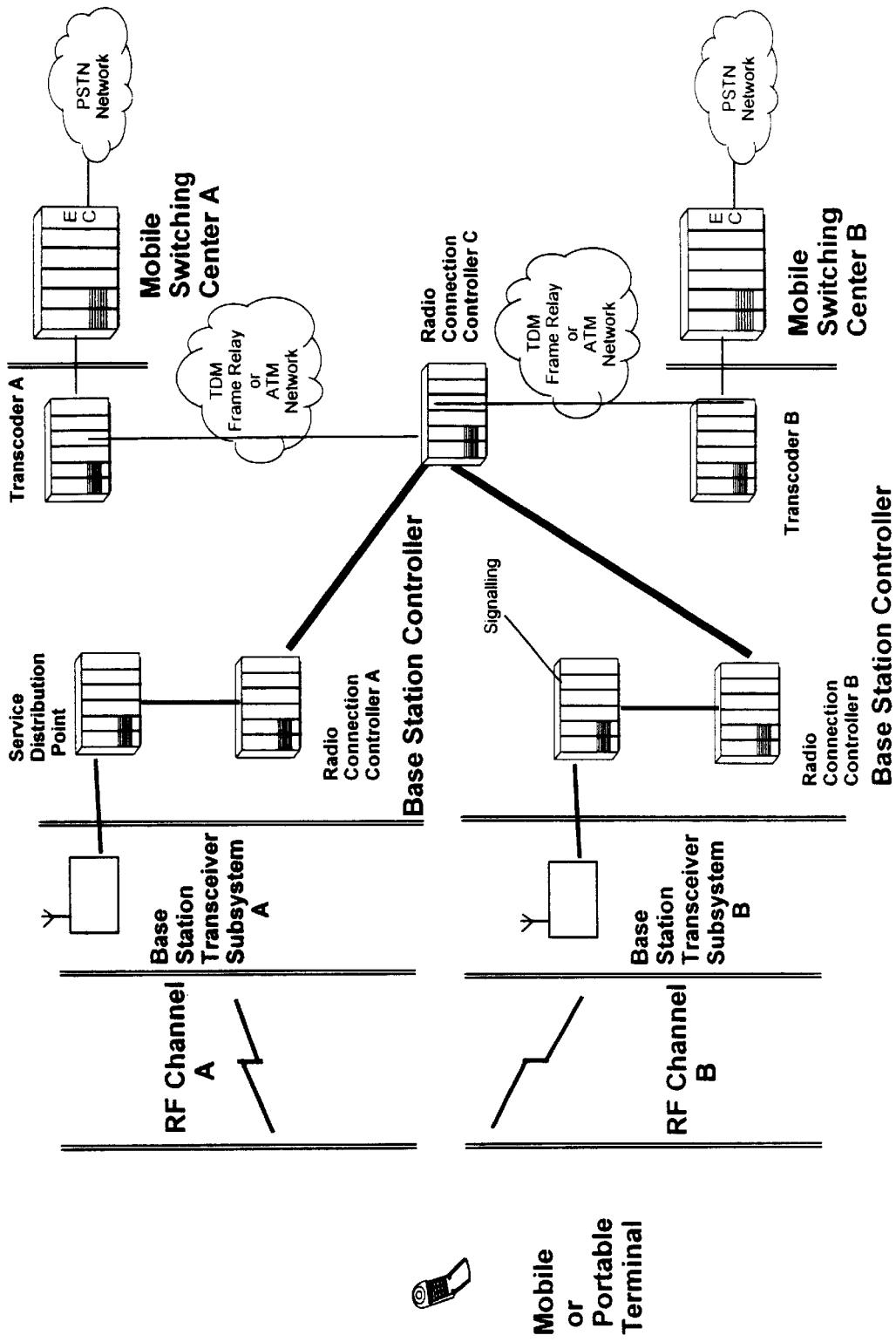
Fig. 3 Inter-MSC Handoff

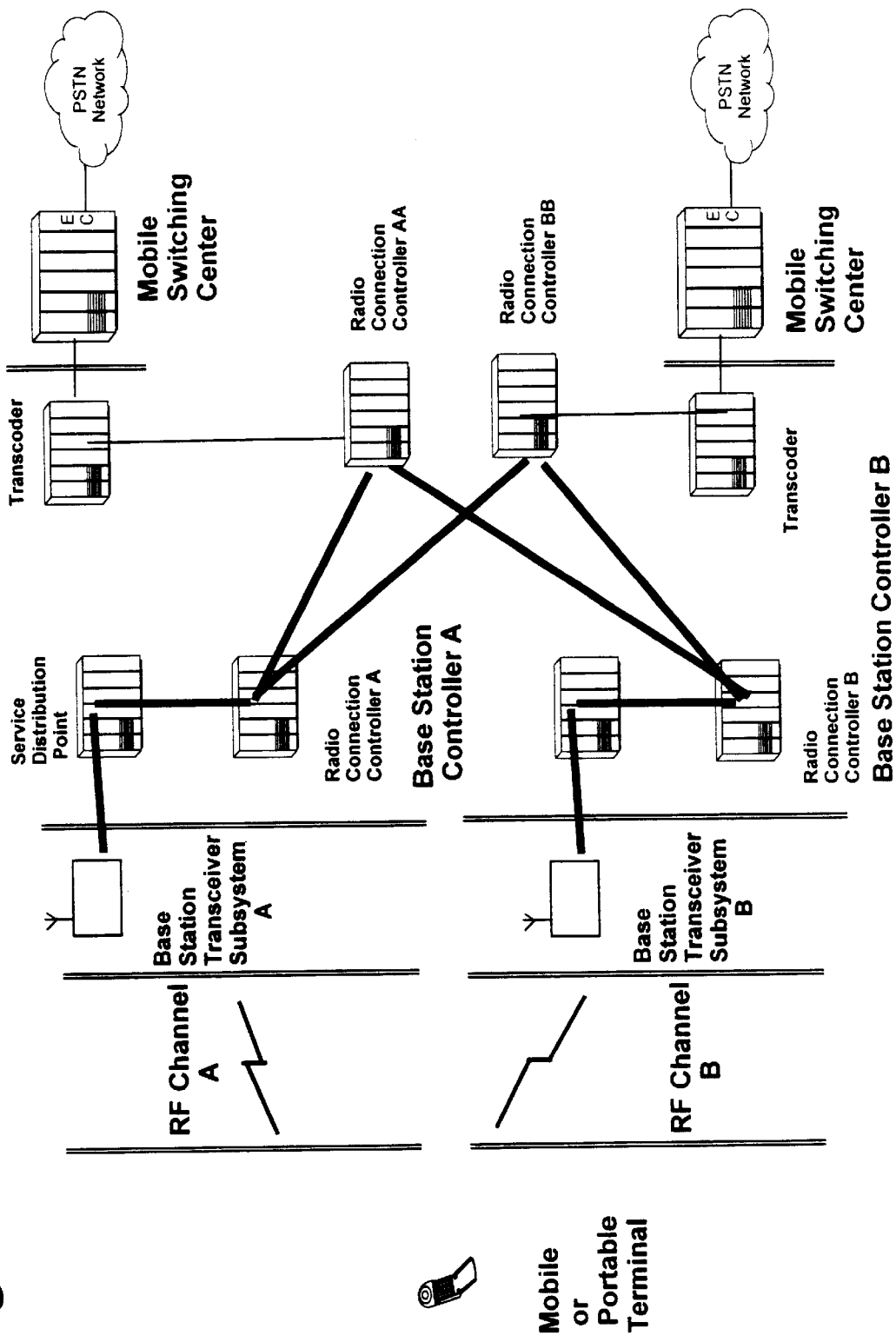
Fig. 4 Inter-System Handoff

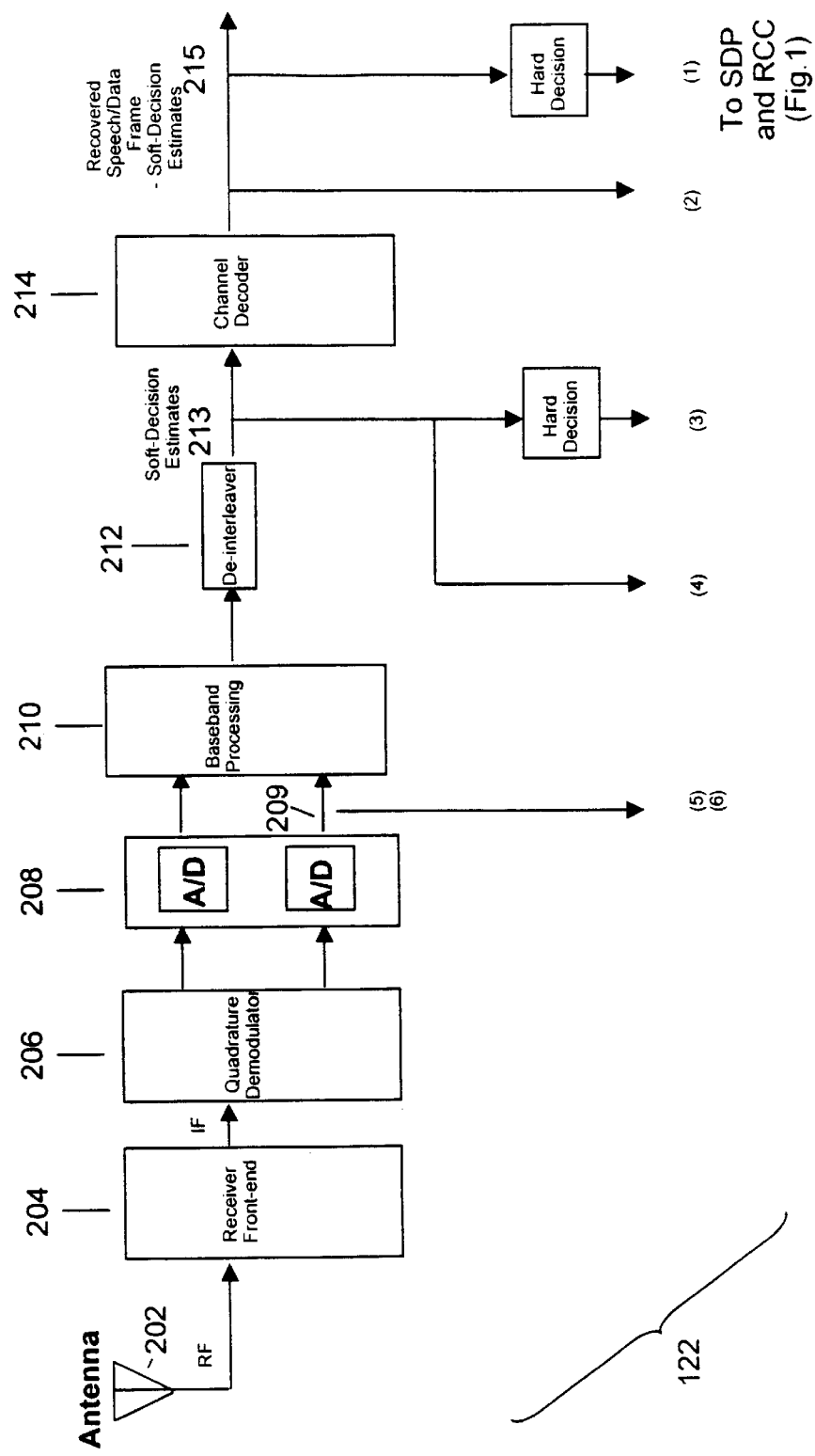
Fig. 5 BTS Receiver Architecture

Fig. 6 – Recovered Speech/Data Frame Structures

Fig. 6a

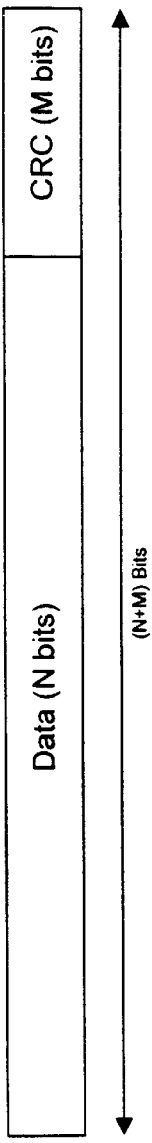

| Data (N bits) | CRC (M bits) |

(N+M) Bits

Fig. 6b - Error Pattern for frame A from BTS A
(o - indicates the bit was correctly received, x indicates an error)

ooo......xxxoxxoxooo................................................ooo

Burst Error 1

Fig. 6c - Error Pattern for frame B from BTS B
(o - indicates the bit was correctly received, x indicates an error)

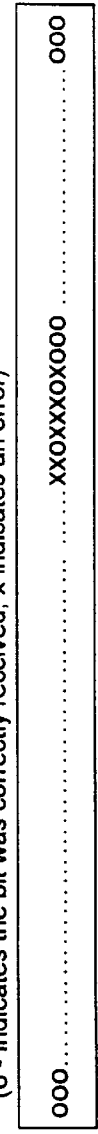

ooo.................................................xxoxxxoxooo......ooo

Burst Error 2

Fig. 6d - Frame C (Bit Pattern Constructed by Performing an Exclusive Or (XOR) Bit-by-Bit on frame A from BTS A and frame B from BTS B)

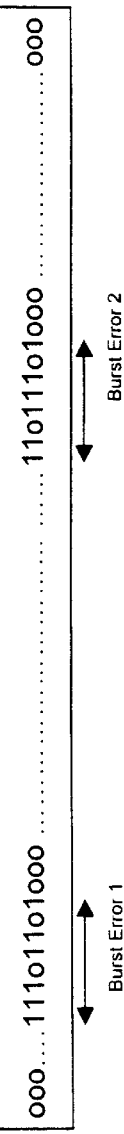

ooo...111o11o1ooo.......................11o111o1ooo............ooo

Burst Error 1                              Burst Error 2

HANDOFF PROCEDURES BASED ON BROADBAND NETWORKS

FIELD OF THE INVENTION

The present invention relates generally to the field of code division multiple access (CDMA) and time division multiple access (TDMA) wireless communications systems, and more particularly to methods of performing handoff of voice, data, or other communications in CDMA and TDMA telecommunications systems.

BACKGROUND OF THE INVENTION

In CDMA wireless communications systems, base stations communicate with mobile units over a common bandwidth using quasi-orthogonal spreading codes to define individual communications channels.

In a TDMA system, each radio channel is divided into a series of time slots, each of which contains a burst of information from a data source, such as a digitally encoded portion of a voice conversation. The time slots are grouped into successive TDMA "frames" having a predetermined duration. The number of time slots in each frame is related to the number of different users that can simultaneously share the radio channel. If each slot in a TDMA frame is assigned to a different user, the duration of a TDMA frame is the minimum amount of time between successive time slots assigned to the same user.

In CDMA systems, because different channels transmitting in the same direction share the same bandwidth, the communications signals on the various channels interfere with each other and contribute to an overall system interference level. System capacity, or the number of active mobile units that can be supported within a given system bandwidth, is limited by acceptable system interference level.

Further, in cellular telecommunications systems such as CDMA or TDMA, as a mobile unit travels from one cell to another, service between the mobile unit and a given base station (or base stations) must be transferred to one or more "new" base stations. This transfer process is termed "handoff." Handoff is normally triggered by some threshold mechanism related to received signal strength, call quality, system loading, or other system parameters.

Handoffs can be "hard" or "soft". A "hard" handoff is characterized by substantially simultaneous termination of communications with the "old" base station and initiation of communications with the "new" base station. The mobile unit is in communication with only one base station at a time.

In a conventional "soft" or "make-before-break" handoff, the mobile unit and one or more "new" base stations establish communications with each other before communications with the "old" base station (or base stations) are interrupted. Soft handoffs provide the advantage of "space diversity"—utilization of signals from geographically distributed locations during handoff. This "diversity combining" provides improved signal coverage and quality.

However, since the mobile unit receives signals from multiple base stations during a soft handoff, the handoff requires the allocation of resources from multiple base stations. In a typical "symmetrical" soft handoff, in which diversity combining is provided on both the uplink (mobile to base station) and downlink (base station to mobile) directions, the provision of multiple signals also generates additional interference for other links.

Thus, the advantages of soft handoff are attained at the expense of increased backhaul requirements (i.e., the terrestrial or "radio" links that connect the base station to the network infrastructure), and greater bandwidth (for the air interface) and processor requirements. With high speed or wideband data such as video, the "cost" of multiple links becomes much more significant than with voice.

By way of example, the IS-95 Standard promulgated by the Telecommunications Industry Association and the Electronic Industries Association (TIA/EIA/IS-95) sets forth parameters for operation of conventional CDMA cellular telecommunications systems. As a design objective, IS-95 specifies a 2-way soft handoff zone at 30% of the service area, and a 3-way soft handoff zone at 10% of the service area. This requires allocation of a significant portion of system resources (radio, processors and other channel elements) to handoff.

Moreover, in conventional implementations of soft handoff, the "anchor" points have limited processing capabilities and information available. As a consequence, the algorithms and performance are sub-optimal.

Accordingly, there exists a need for methods and systems that optimize uplink backhaul bandwidth and processor usage during handoffs.

It is therefore an object of the present invention to provide methods and apparatus that optimize uplink backhaul bandwidth and processor usage during handoff.

These and other objects of the invention will become apparant to those skilled in the art from the following description.

SUMMARY OF THE INVENTION

The foregoing objects, among others, are attained by the invention, which in one aspect provides base station controllers (BSCs), base transceiver subsystems (BTSs), mobile switching centers (MSCs) and radio connection controllers (RCCs) that cooperate to provide improved handoff. The terms BTS, RCC and MSC are used herein to denominate modules that execute known functions. Other labels can be used to designate these modules; and it is intended to cover any combination that executes the functions of the invention described herein.

In one aspect of the invention, the BTS performs a monitoring function, and determines whether it has valid data that originated from a mobile unit. In another aspect of the invention, the RCC performs the monitoring function, and determines whether it has valid data—if it does not, it requests the BTS to send more information.

In one aspect of the invention, in a "soft handoff" involving a number "n" of BTSs (where n is greater than or equal to 2), the RCC executes the following operations:

(1) The RCC checks whether the information frame from any of the BTSs is valid. If 1 or more information frames is valid, then a valid frame is forwarded to a transcoder or data server or to some other network device. For simplicity, any reference to a transcoder, data server or to some other network device(s), is intended to include reference to any of these devices. If none of the received frames is valid, then the process continues at step 2 below.

(2) The RCC decodes the R=1/n code constructed from data received from the n BTSs.

(3) The RCC checks whether the decoded information frame is valid using the checksum or CRC transmitted with the information frame. If the information frame is valid, then this frame is forwarded to the transcoder or a data server. Otherwise, the system sends an invalid frame, indicated as such, or a "control" frame indicating an "errored" invalid frame was received.

The invention thus provides methods and apparatus to improve the performance of soft handoff in wireless systems, and thereby improve the capacity and user perception of these systems. These methods can also be used to provide and improve the performance of macroscopic diversity.

The methods can also be applied to inter-BSC, inter-MSC and inter-system handover, each of which constitute "problem scenarios" in conventional implementations.

The invention will next be described in connection with certain illustrated embodiments and practices. However, it will be clear to those skilled in the art that various modifications, additions and subtractions can be made without departing from the spirit or scope of the claims.

BRIEF DESCRIPTIONS OF THE DRAWINGS

For a fuller understanding of the nature and objects of the invention, reference should be made to the following detailed description and accompanying drawings, in which:

FIG. 1 is a schematic diagram of an intra-Base Station Controller (BSC) handoff in accordance with the present invention.

FIG. 2 is a schematic diagram of an inter-BSC handoff in accordance with the present invention.

FIG. 3 is a schematic diagram of an inter-mobile switching center (MSC) handoff in accordance with the present invention.

FIG. 4 is a schematic diagram of an inter-system handoff in accordance with the present invention.

FIG. 5 is a schematic diagram of BTS receiver architecture in accordance with the present invention.

FIG. 6 depicts an example of handling data frames in accordance with the present invention.

DETAILED DESCRIPTION OF THE INVENTION

The present invention, as depicted in FIGS. 1–5, utilizes broadband transport based on high-speed fiber, copper and radio distribution and known switching techniques to improve handoff in wireless systems. The invention exploits the availability of high-speed backhaul (the terrestrial or radio links that connect the base station to the network infrastructure). Thus, while the methods and apparatus described herein are applicable to asynchronous transfer mode (ATM) cell-based switching, ATM is not the only mode to which the invention is applicable. Other packet-based systems can be utilized in connection with the invention.

FIG. 1 is a schematic block diagram showing the architecture and signal flow in accordance with one practice of the invention for an intra-BSC handoff. As shown in FIG. 1, base station controller (BSC) 100 is partitioned into three functional units: a service distribution point (SDP) 102; a radio connection controller (RCC) 104; and a transcoder 106. These functional units can be co-located or distributed in a broadband network as shown in FIG. 1.

As FIG. 1 indicates, ATM signals from base station transceiver subsystems (BTSs) 122, 124 are transmitted to SDP 102. Signaling information is routed to signaling processors and the voice/data information is routed to RCC 104. Heavy lines in FIG. 1 are utilized to indicate that these are ATM connections. Thus, the BTSs 122, 124, SDP 102 and RCC 104 are interconnected by permanent virtual paths or circuits—i.e., digital links carrying ATM traffic. The noted configuration is provided by way of example only. Those skilled in the art will appreciate that the system could also utilize switched virtual circuits.

The function of the SDP 102 is to segregate and/or aggregate the traffic from or to the base stations and route the ATM traffic to and from the appropriate servers. In particular, the SDP 102 routes signaling traffic to signaling servers, and voice/data traffic to RCC 104. In some cases the voice/data information may include associated signaling information that is also routed to RCC 104.

RCC 104 provides an "anchor point" for the wireless portion of the call, triggers handover decisions for "hard" and "soft" handoffs, and routes the speech/data frames or cells as required.

Referring again to FIG. 1, for voice calls to the public switched telephone network (PSTN) 120, speech frames are forwarded to transcoder 106. The transcoder 106 converts low-bit-rate speech to companded PCM (pulse-code modulation) and interfaces to the mobile switching center 112. Data frames or cells are routed to a data server.

Typically, the speech/data is transmitted over the air interface as packets or frames. The incoming speech/data at the subscriber terminal is collected, organized into frames, low-bit rate encoded in the case of speech or possibly compressed in the case of data. Control information is added to the low bit rate encoded speech or data frame and forward error control (FEC) is applied, 124, typically using known block, convolutional, or turbo coding techniques. This information is then transmitted over the RF channel 114, 116.

The uplink transmission from the terminal over the RF channel 114, 116 is received by the BTS 122, 124. Typically, in conventional systems, the BTS 122, 124 recovers the radio signal and decodes the data. The FEC decoder corrects, if possible, and detects residual errors in the received speech/data frame. The BTS 122, 124 transfers the speech/data frame to the BSC with an indication (usually 1 bit) of whether the frame has been correctly received (i.e., is "valid") or is in error and with an estimate (usually 1 byte) of the quality of the recovered frame.

The SDP 102 routes the voice/data frame to the RCC 104. In a handoff situation, 2 or more BTSs 122, 124 are connected to the RCC 104.

In a "hard" handoff, the RCC 104 simply forwards the speech/data frames received from the BTS 122, 124 to the transcoder 106 or a data server. The RCC will only receive 1 frame per frame interval from the BTSs, since in a hard handoff the terminal is only connected to a single BTS. In the downlink direction, the RCC relays information frames to all the BTSs involved in the handoff, An advantage of using the RCC is that the connections from the RCC to the BTS are pre-established permanent virtual circuits or paths, or switched virtual circuits which are established per call or per data session. This simplifies timing in hard handoff. Network connections do not need to be established synchronously with the rerouting of the radio channel from one BTS to a second BTS.

In a "soft" handoff, the RCC 104 examines the speech/data frames received from the BTSs 122, 124. Typically, in current systems, if 1 or more of these frames is "valid" then a valid frame is routed to the transcoder 106 or a data server. In the downlink direction, again the RCC 104 relays information frames to all the BTSs involved in the handoff.

In accordance with the invention, improved "soft" handoff can be achieved by having the BTSs 122, 124 provide more information to the RCC 104 and by further processing at the RCC 104.

Moreover, the present invention can be implemented in an asymmetrical handoff condition, in which soft handoff is provided only on the uplink. This type of handoff utilizes receiver resources from different base stations on the uplink, such that several base stations will receive the signal from a mobile unit and transmit information to the controller. This "uplink-only" soft handoff will not increase interference on the air interface. In fact, it is likely to decrease the signal strength required at the base stations and thus reduce the interference generated by the mobile unit.

A high-level block diagram of a BTS 122 receiver architecture is shown in FIG. 5. The architecture includes antenna 202, receiver front-end 204, quadrature demodulator 206, analog to digital converters (A/Ds) 208, baseband processor 210, de-interleaver 212, and channel decoder 214. Each of these modules can be constructed in accordance with conventional RF and circuit design practices. While this diagram illustrates a simplified version of a BTS 122, those skilled in the art will recognize that antenna 202 could be multiple antennas 202 including main and diversity antennas in one or more sectors participating in a "softer hand-off", multiple receivers 204, etc.

In accordance with the invention, performance is improved incrementally, in stages, by increasing the information transmitted to the RCC 104 and the processing performed by the RCC 104 in each stage. These "stages" are denoted by reference numerals (1)–(5) in FIG. 5. In the successive stages, the RCC 104 processes information "closer" to the antenna 202.

Set forth below are six examples of handoff in accordance with the invention, corresponding to the six signal paths (1)-(6) shown in FIG. 5. Those skilled in the art will appreciate that modifications can be made, within the spirit and scope of the invention.

Method 1: Referring to FIGS. 1 and 5, in a "soft" handoff involving a number "n" of BTSs (where n is greater than or equal to 2), the RCC executes the following operations:

(a) The RCC checks whether the information frame from any of the BTSs is valid. (The information frame from the BTS, when not valid, must include a checksum or CRC (cyclic redundancy check) that was transmitted over the air). International Standard IS-54, for example, requires such a CRC over the Class 1 bits. Similarly, the PACS protocol provides for a CRC.) If 1 or more information frames is valid, then a valid frame is forwarded to the transcoder 106 (FIG. 1) or a data server. Forwarded frames can be selected in a number of ways (e.g., the valid frame with the maximum value of the quality metric, or by examining the frames sequentially and selecting the first valid frame, etc). If none of the received frames is valid, then the process continues, as follows.

(b) The RCC decodes the R=1/n code constructed from data received from the n BTSs. If n>2, this is simply majority logic decoding.

(c) The RCC checks whether the decoded information frame is valid using the checksum or CRC. (Note: n=2 is a special case, and the checksum or CRC can also be tested for this case) as described below. If the information frame is valid, then this frame is forwarded to the transcoder 106 (FIG. 1) or a data server. Otherwise, the system sends an invalid frame, indicated as such, or a "control" frame indicating an "errored" invalid frame was received.

The foregoing method does not significantly increase the data rate from the BTS 122 to the RCC 104 (FIG. 1). The only incremental data is the requirement to append the checksum or CRC to the frame. In the BTS 122, as shown in FIG. 5, the recovered speech/data frames ((1) in FIG. 5) are transmitted to the RCC 104 (FIG. 1).

The following elaborates on Method 1 for the case n=2. Specifically, it is described how the RCC decodes the R=1/2 code constructed from data received from 2 BTSs (i.e. information frame A received from BTS A and information frame B received from BTS B).

FIG. 6*a* describes a typical frame structure for the received data. The frame consists of speech or data (N bits) and a CRC or checksum (M bits). For certain FEC codes and decoders (e.g. convolutional codes and Viterbi decoders) errors typically occur in bursts. (A burst error of length 1 is defined as a number of bit errors where the errors are among 1 successive bits, the first and last of which are in error.) Typical error patterns are shown in FIG. 6*b* and 6*c* for the information frames A and B received from BTS A and B respectively, with 0's representing correctly received bits, and X's representing bits received in error.

The R=1/2 decoder in the RCC forms a new frame, frame C, by doing a bit-by bit Exclusive Or (XOR) on the information frames from BTS A and BTS B as shown in FIG. 6*d*. The bit positions in frame C with a "1" represent bit positions where either information frame A or information frame B are in error.

In FIG. 6, information frame C has 2 error bursts, labeled as Burst 1 and Burst 2. Two new information frames are now constructed (I1 and I2). To construct information frame I1, the bits from frame A corresponding to Burst 1 are replaced with the corresponding bits from frame B. To construct frame I2, the bits from frame A corresponding to Burst 2 are replaced with the corresponding bits from frame B. (Note that different logical operations can be used to create information frames I1 and I2.)

The RCC then checks whether either of the information frames I1 and I2 are valid using the checksum or CRC. If I1 is valid and I2 is not valid, then the RCC forwards information frame I1 to the transcoder 106 (FIG. 1) or a data server. If I2 is valid and I1 is not valid, then the RCC forwards information frame I2.

If I1 and I2 are both valid, then the RCC forwards (i) I1 or I2, (ii) an invalid frame indicated as such, or (iii) a "control" frame indicating an "errored" invalid frame was received.

If both I1 and I2 are invalid, then the RCC sends an invalid frame indicated as such, or a "control" frame indicating an "errored" invalid frame was received.

If information frame C has 3 error bursts, labeled as Burst 1, Burst 2 and Burst 3 respectively then six new information frames are constructed (I1 to I6). To construct information frame I1/I2/I3, start with information frame A and replace the bits in the bit positions corresponding to Burst 1/2/3 respectively with the corresponding bits from information frame B. To construct information frame I4/I5/I6, start with information frame A and replace the bits in the bit positions corresponding to Bursts 1 and 2/Bursts 2 and 3/Bursts 1 and 3 respectively with the corresponding bits from information frame B. (Note that different logical operations can be used to create information frames I1 to I6.) There is no need to construct a seventh possible frame which would replace all bit positions corresponding to all of the error bursts since that would indicate that one of the two frames was already valid.

The RCC then checks whether the information frames I1 to I6 are valid using the checksum or CRC. If any frame Ik, k=1 to 6, is valid and the other frames are not valid, then the RCC forwards information frame Ik to the transcoder 106 (FIG. 1) or a data server. If two or more of information frames Ik are valid, the RCC sends (i) one of the valid frames, (ii) an invalid frame indicated as such, or (iii) a "control" frame indicating an "errored" invalid frame was received. If none of the information frames Ik is valid, then the system sends an invalid frame indicated as such, or a "control" frame indicating an "errored" invalid frame was received.

To generalize, if in frame C there are i>3 error bursts, then I new information frames I1 to II are constructed, where $I = {}^iC_{i-1} + {}^iC_{i-2} + \ldots + {}^iC_1$.

To construct these I information frames start with information frame A and replace the bits in the bit positions corresponding to Bursts 1 to i (taking 1 burst at a time, pairs of bursts, 3 bursts at a time up to (i-1) bursts at a time) with the corresponding bits from information frame B. (Note that different logical operations can be used to create information frames I1 to II.)

The RCC then checks whether the information frames I1 to II are valid using the checksum or CRC. If one frame Ik, k=1 to I, is valid and the other frames are not valid, then the RCC forwards the valid information frame Ik to the transcoder 106 (FIG. 1) or a data server.

If two or more of information frames Ik are valid, the RCC sends (i) one of the valid frames, (ii) an invalid frame indicated as such, or (iii) a "control" frame indicating an "errored" invalid frame was received.

If none of the information frames Ik is valid, then the RCC sends an invalid frame indicated as such, or a "control" frame indicating an "errored" invalid frame was received.

In an embodiment of the invention, if in frame C there is only 1 error burst or the number of error bursts exceeds a threshold (typically 2 error bursts) then the system sends an invalid frame indicated as such, or a "control" frame indicating an "errored" invalid frame was received.

Method 2: The following method applies to signal path (2) shown in FIG. 5. In a "soft" handoff involving n BTSs (n>=2), the BTSs recover the radio signal and send soft decision estimates of the data (including the FEC data) to the channel decoder 214. The FEC decoders use these soft decision estimates to attempt to correct and detect residual errors in the received speech/data frame. The channel decoder outputs soft decision estimates of the speech/data information and the check sum or CRC for the frame. If the information is considered valid (based on the hard decisions in signal path (1)), then this frame is forwarded to the RCC 104.

If the information frame is not valid, then the soft decision output of channel decoder 214, which includes the soft decision estimates of the information bits and the check bits from the validity check, is forwarded to the RCC 104 along with a quality measure for the entire frame (based on average received signal strength indication, signal-to-noise ratio, estimate of frame bit error rate, or similar parameter) (termed a soft decision information frame).

In accordance with this practice of the invention, the RCC executes the following operations:

(a) The RCC checks whether an information frame from any of the n BTSs is valid. If 1 or more of these information frames is valid, then a frame is forwarded to the transcoder 106 (FIG. 1) or a data server. If none of the n frames is valid, the process continues, as follows.

(b) The RCC forms a weighted sum of the soft decision estimates from the channel decoders from the n BTSs. The weighting is based on the quality measures. For example, if n=3, the new estimate is given by the following expression:

$$S(j) = x \, s1(j) + c(2)x \, s2(j) + c(3)x \, s3(j)$$

where:

si(j) is the jth soft-decision estimate (i.e., the estimate for the jth bit in the frame) from the ith BTS; and c(i) is the weighting coefficient for the ith BTS.

A weighted sum is constructed for each bit. This sum is a new soft-decision estimate of the received data. A weighted sum is constructed for the information bits in a frame and the bits in the checksum or CRC. Hard decision decoding is then applied to the bits in the information frame.

(c) The checksum or CRC is checked for validity. If this information frame is valid, then it is forwarded to the transcoder 106 (FIG. 1) or data server. Otherwise, the system sends an invalid frame, indicated as such, or a "control" frame indicating an "errored" invalid frame was received.

Method 2 increases the data rate from the BTS to the RCC and results in greater variability in the data rate. If one assumes that the soft decision estimates use 4 bits, then for invalid frames, the data transmitted to the RCC increases by approximately a factor of 4.

Method 3: This method corresponds to signal path (3) shown in FIG. 5. In a "soft" handoff involving n BTSs (n>=2), the BTSs recover the radio signal and send soft decision estimates of the data to the channel decoder 214. The FEC decoders use these soft decision estimates to attempt to correct and detect residual errors in the received speech/data frame. If the information is valid, then this frame is forwarded to the RCC 104. If the information frame is not valid, then a hard-decision is performed on the soft decision estimates 213, which includes the soft decision estimates of the information bits and the check bits from the validity check, and this hard-decision information is forwarded to the RCC 104 along with a quality measure for the entire frame (based on average received signal strength indication, signal-to-noise ratio, estimate of frame bit error rate, or similar parameter) (termed a hard-decision frame).

In accordance with this practice of the invention, the RCC executes the following operations:

(a) The RCC checks whether an information frame from any of the n BTSs is valid. If 1 or more of these information frames is valid, then a frame is forwarded to the transcoder 106 (FIG. 1) or a data server. If none of the n frames is valid, the process continues as follows.

(b) The RCC constructs new codes from the n received hard-decision frames by interleaving the hard-decision data from m BTSs (where m>=2 and <=n).

For example, if m=3, the new code is:

$$s1(0), s2(0), s3(0), s1(1), s2(1), s3(1), s1(2), s2(2), s3(2),$$

where si(k) is the kth bit from the ith BTS. The quality measure can be used to exclude certain hard-decision frames from the code construction.

If j BTSs are included, then codes can be constructed by combining 2, 3, ..., j hard-decision frames at a time. The number of possible codes is given by the following expression:

$${}^jC_j + {}^jC_{j-1} + \ldots + {}^jC_2$$

(c) The codes constructed in (b) are decoded by the RCC (Chase decoding) and the resulting information frames checked for validity. If an information frame is valid, then the remaining codes do not need to be decoded, and this frame is forwarded to the transcoder 106 (FIG. 1) or data server. Otherwise, the system sends an invalid frame, indicated as such, or a "control" frame indicating an "errored" invalid frame was received.

The foregoing Method 3 increases the data rate from the BTS to the RCC and results in greater variability in the data rate. For example, in the IS-95 Standard, the uplink employs an R=1/3 convolutional code. Then for invalid frames, the data transmitted to the RCC increases by approximately a factor of 3.

Method 4: This method corresponds to signal path (4) shown in FIG. 5. In a "soft" handoff involving n BTSs (n>=2), the BTSs recover the radio signal and send soft decision estimates 213 of the data to the channel decoder 214. If one or more of the n BTSs employ multiple antennas, as in a "softer" hand-off, signals received by the multiple antennas contribute to the soft decision estimates 213. The FEC decoders use these soft decision estimates to attempt to correct and detect residual errors in the received speech/data frame. If the information is valid, then this frame is forwarded to the RCC 104. If the information frame is not valid, then the soft decision input to the FEC decoder, which includes the soft decision estimates of the information bits and the check bits from the validity check, is forwarded to the RCC 104 along with a quality measure for the entire frame (based on average received signal strength indication, signal-to-noise ratio, estimate of frame bit error rate, or similar parameter) (termed a soft-decision frame).

In accordance with this practice of the invention, the RCC executes the following operations:

(a) The RCC checks whether an information frame from any of the n BTSs is valid. If 1 or more of these information frames is valid, then a frame is forwarded to the transcoder 106 (FIG. 1) or a data server. If none of the n frames is valid, the process continues, as follows.

(b) The RCC constructs new codes from the n received soft-decision frames by interleaving the soft-decision estimates from m BTSs (where m>2 and <=n).

For example, if m=3, the new code is:

$s1(0), s2(0), s3(0), s1(1), s2(1), s3(1), sl(2), s2(2), s3(2),$ where si(k) is the kth estimate from the ith BTS. The quality measure can be used to exclude certain soft-decision frames from the code construction.

If j BTSs are included, then codes can be constructed by combining 2, 3, . . . j soft-decision frames at a time. The number of possible codes is given by the following expression:

$${}^{j}C_{j} + {}^{j}C_{j-1} + \ldots + {}^{j}C_{2}$$

(c) The codes constructed in (b) are decoded by the RCC (Chase decoding) and the resulting information frames checked for validity. If an information frame is valid, then the remaining codes do not need to be decoded, and this frame is forwarded to the transcoder 106 (FIG. 1) or data server. Otherwise, the system sends an invalid frame, indicated as such, or a "control" frame indicating an "errored" invalid frame was received.

An alternative to Chase decoding is to create a weighted sum of the soft-decision estimates from the n BTSs. The weighting is based on the quality measures.

For example, if m=3, the new estimate is given by the following expression:

$$S(k) = c(1) \times s1(k) + c(2) \times s2(k) + c(3) \times s3(k)$$

where:

si(k) is the kth soft-decision estimate from the ith BTS; and c(i) is the weighting coefficient for the ith BTS.

One or more such weighted sums can be constructed. This sum is a new soft-decision estimate of the received data, and is a form of baseband combining.

An FEC decoder uses these soft decision estimates to attempt to correct and detect residual errors in the received speech/data frame. This can be done for convolutional, turbo, and block codes. If the information is valid, then this frame is forwarded to the RCC 104 (FIG. 1).

The foregoing Method 4 increases the data rate from the BTS to the RCC and results in greater variability in the data rate. In the BTS 122, as shown in FIG. 5, the soft-decision frames ((3) in FIG. 5) are obtained from the de-interleaver 212 and the baseband processor 210.

For example, in the IS-95 Standard, the uplink employs an R=1/3 convolutional code. If one assumes that the soft decision estimates use 4 bits, then for invalid frames, the data transmitted to the RCC increases by approximately a factor of 12.

Method 5: This method corresponds to signal path (5) shown in FIG. 5. In a "soft" handoff involving n BTSs (n>=2), the demodulator 206 and baseband processor 210 in the BTS recover the radio signal and send soft decision estimates 213 of the data to the decoder 214. The structure can be generalized to include multiple antennas. The signals from the antennas can be combined in various ways, such as maximal ratio combining, selection diversity, etc. The FEC decoders in decoder 214 use these soft decision estimates to attempt to correct and detect residual errors in the received speech/data frame.

If the information is valid, then the frame is forwarded to the RCC to produce the soft decision estimates 213.

If the information frame is not valid, then the input 209 to the baseband processor 210 is forwarded to the RCC 104 (FIG. 1) along with (i) the variables that define the state of the baseband processor and (ii) a quality measure for the entire frame (based on average received signal strength indication, signal-to-noise ratio, or similar parameter) (termed a baseband frame).

The baseband frame must span the interval of the de-interleaver. For IS-95, for invalid frames, the data transmitted to the RCC 104 increases by at least a factor of two thousand (2000).

The RCC then executes the following steps:

(a) The RCC checks if an information frame from any of the n BTSs is valid. If one or more of these information frames is valid, then a frame is forwarded to the transcoder 106 (FIG. 1) or a data server. If none of the n frames is valid, the process continues.

(b) The RCC combines the baseband frames from the n BTSs (using conventional optimal, equal gain combining, or delayed diversity combining techniques) and implements the functions of a baseband processor, de-interleaver and channel decoder to recover an information frame.

(c) If this information frame is valid, then it is forwarded to the transcoder 106 (FIG. 1) or data server. Otherwise, the system sends an invalid frame, indicated as such, or a "control" frame indicating an "errored" invalid frame was received.

In the BTS 122, as shown in FIG. 5, the baseband frames (ref. no. 4) are the complex quadrature output (I, Q) of the A/Ds 208. Those skilled in the art will appreciate that other configurations can be employed. By way of example, the demodulators and pair of A/Ds shown could be replaced by a single A/D followed by digital signal processing (DSP) to obtain the quadrature outputs (I, Q).

Method 6: Method 5 described above is more efficient for TDMA (time division multiple access) systems than for CDMA (code division multiple access) systems. TDMA systems can also support soft handoff. For example, soft handoff is part of the DECT standard.

Referring to FIG. 5, in CDMA systems, the output 209 of the A/Ds 208 contains multiple information streams. The baseband processor 210 de-spreads the signal to obtain the signal for an individual subscriber.

If any of the subscribers whose signals are multiplexed in the A/D output signals is in a soft-handoff situation, then method 5 requires that a baseband frame be transmitted to the RCC 104 (FIG. 1). The baseband frame may include A/D output signals associated with one or more antennas involved in the communication to the subscriber.

If two or more subscribers are in a soft-handoff situation, then the multi-cast capability of ATM networks can be used to direct baseband frames constructed from the I, Q outputs of the A/Ds to multiple processors in the RCC 104.

An alternative is to continuously transmit this signal to the RCC (path 6), and use multi-cast/broadcast to route these BTS signals to the appropriate baseband processors/de-interleaver/channel decoders for the duration of the soft handoff. The approximate data rate required for each antenna is given by the expression: $2 \times f_{chip} \times (4$ bits for I+4 bits for Q). For a 1.23 MHZ IS-95 channel, this is approximately 20 Mbits/second per antenna per sector. Digital signal processing (DSP) techniques can be used to increase the sampling rate at the input to the baseband processor.

Optimal, equal gain or delayed diversity combining may also be possible at the BTS, to combine the signals from the diversity antennas into a single digital stream to the RCC. Delayed diversity combining does not require co-phasing of the diversity signals.

A Rake receiver for CDMA systems and an equalizer for TDMA systems can be used to obtain the diversity advantage. This delayed diversity reception is a useful feature of the present invention.

An alternative to the methods presented above is to use a form of Automatic Repeat Request (ARQ). Initially, for each frame received at the BTS, the recovered information frame 215 (FIG. 5) is forwarded to the RCC 104 (FIG. 1). If the RCC cannot recover a valid frame, then the RCC requests additional information from the BTSs. The BTSs forward this new information (as in Methods 2–5 above) to the RCC. This minimizes the data rate from the BTSs to the RCC and may prove useful if the transmission delay is not excessive or the service is not particularly delay sensitive.

As noted elsewhere herein, the system can also execute asymmetrical soft handoff, in which soft handoff is provided on the receive side, without providing soft handoff on the transmit side.

Although the above descriptions pertain to handoff, the methods can also be used to provide macroscopic diversity. In the downlink direction, the RCC 104 routes the signals destined for the terminals to the BTSs 122, 124. The BTSs can simulcast the signals or use delayed diversity transmission techniques.

In a further practice of the invention, a hierarchy of radio connection controllers can be established. FIG. 2 shows such a hierarchy, as used in conjunction with an inter-BSC handoff. Although RCC C is shown as a distinct unit, it could be co-located or integrated with RCC A or RCC B.

The methods described above can also be applied in the FIG. 2 configuration, as follows. RCC A executes the method steps described above to obtain a valid frame. If a valid frame is obtained, this frame is forwarded to RCC C. If a valid frame is not obtained, then RCC A forwards the information received from its BTSs to RCC C. RCC B does the same. RCC C then executes the method steps described above to forward information to the transcoder or data server.

FIG. 3 shows an inter-MSC handoff. In this scenario RCC C is connected to two transcoders and communicates with these transcoders under the control of the MSCs.

FIG. 4 shows an inter-system handoff. Each system has a radio connection controller (RCC AA and RCC BB) responsible for inter-system handoffs and connected to "border" RCCs. An alternative is to directly link RCC AA and RCC BB, such that border RCCs are connected only to their inter-system RCCs.

It will thus be seen that the invention efficiently attains the objects set forth above, among those made apparent from the preceding description.

In particular, the invention provides improved handoff methods in broadband networks.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A method for improving performance of soft handoff in a telecommunications system having a plurality of base stations and a mobile unit in handoff communication (uplink only or in both uplink and downlink) with at least two of the base stations over at least first and second respective communications links, the first and second communications links each comprising at least one base station transceiver subsystem (BTS) for receiving and processing data from the mobile unit and transmitting information to at least one radio connection controller (RCC) which receives transmissions from the at least two of the base stations, the handoff method comprising:

the BTS receiving an information frame, decoding said received information frame and determining if said decoded information frame is valid; and said BTS generating and transmitting a transmission frame including a quality metric, an additional amount of information and an indication of said additional information for receipt by said RCC.

2. The method for improving soft handoff according to claim 1 wherein if said information frame is determined to be valid, said transmission frame includes said decoded information frame and said additional amount of information includes no information and said indication is an indication that no additional information is being transmitted.

3. The method for improving soft handoff according to claim 1 wherein if said information frame is determined to be invalid said additional information includes a validity check.

4. The method for improving soft handoff according to claim 3 wherein said validity check is a CRC.

5. The method for improving soft handoff according to claim 3 wherein said validity check is a check sum.

6. The method for improving soft handoff according to claim 1 wherein:
   if said information frame is determined to be invalid said transmission frame includes a soft-decision information frame; and
   said additional information includes an indication to said RCC that said transmission frame includes said soft-decision information frame.

7. The method for improving soft handoff according to claim 1 wherein if said information frame is determined to be invalid:
   said transmission frame includes said decoded information frame; and
   said additional information includes a soft-decision information frame.

8. The method for improving soft handoff according to claim 1 wherein if said information frame is determined to be invalid:
   said transmission frame includes said decoded information frame; and
   said additional information includes information for enabling said RCC to reconstruct a soft-decision information frame.

9. The method for improving soft handoff according to claim 1 wherein:
   if said information frame is determined to be invalid said transmission frame includes a soft-decision frame; and
   said additional information includes an indication to said RCC that said transmission frame includes said soft-decision frame.

10. The method for improving soft handoff according to claim 1 wherein if said information frame is determined to be invalid:
    said transmission frame includes said decoded information frame; and
    said additional information includes a soft-decision frame.

11. The method for improving soft handoff according to claim 1 wherein:
    if said information frame is determined to be invalid said transmission frame includes a hard decision frame; and
    said additional information includes an indication to said RCC that said transmission frame includes said hard decision information frame.

12. The method for improving soft handoff according to claim 1 wherein if said information frame is determined to be invalid:
    said transmission frame includes said decoded information frame; and
    said additional information includes a hard decision frame.

13. The method for improving soft handoff according to claim 1 wherein:
    if said information frame is determined to be invalid said transmission frame includes a baseband frame and variables defining a state of a baseband processor; and
    said additional information includes an indication to said RCC that said transmission frame includes said baseband frame and variables defining said state of said baseband processor.

14. The method for improving soft handoff according to claim 1 wherein if said information frame is determined to be invalid:
    said transmission frame includes said decoded information frame; and
    said additional information includes a baseband frame and variables defining a state of a baseband processor.

15. A method for improving performance of soft handoff in a telecommunications system having a plurality of base stations and a mobile unit in handoff communication (uplink only or in both uplink and downlink) with at least two of the base stations over at least first and second respective communications links, the first and second communications links each comprising at least one base station transceiver subsystem (BTS) for receiving and processing data from the mobile unit and transmitting information to at least one radio connection controller (RCC) which receives transmissions from the at least two of the base stations and determining if any valid frame is received, and a network for receiving and processing information frames from the RCC, the handoff method comprising:
    said RCC receiving a transmission frame including a quality metric, an additional amount of information and an indication of said additional information from a BTS in each of said at least two base stations;
    said RCC determining if one or more of said transmission frames includes a valid information frame;
    if at least one of said transmission frames includes a valid information frame, said RCC transmitting said valid information frame to a remainder of said network;
    if none of said transmission frames includes a valid information frame, said RCC performing additional processing on said transmission frames and said additional information.

16. A method for improving performance of soft handoff in a telecommunications system having a plurality of base stations and a mobile unit in handoff communication (uplink only or in both uplink and downlink) with at least two of the base stations over at least first and second respective communications links, the first and second communications links each comprising at least one base station transceiver subsystem (BTS) for receiving and processing data from the mobile unit and at least one of the BTSs transmitting information to a first radio connection controller (RCC) and at least one of the BTSs transmitting information to a second RCC, the handoff method comprising:
    said first RCC receiving a transmission frame including a quality metric, an additional amount of information and an indication of said additional information from one of said BTSs;
    said first RCC transmitting said transmission frame including said quality metric, said additional amount of information and said indication of said additional information to another RCC if said first RCC determines that said transmission frame does not include a valid information frame and said first RCC is unable to reconstruct a valid information frame.

17. The method for improving performance of soft handoff according to claim 15 wherein said remainder of said network includes another RCC.

18. The method for improving performance of soft handoff according to claim 17 wherein said additional processing comprises forwarding said transmission frame, said additional amount of information and said indication of said additional information to said another RCC.

19. The method for improving performance of soft handoff according to claim 15 wherein:
    said transmission frames include decoded information frames which include a plurality of data bits in particular positions;

said additional information from each BTS includes a validity check including decoded check bits in particular positions;

said at least two base stations includes at least three base stations; and said additional processing includes:

creating extended information frames by appending said decoded check bits to said decoded information frames;

creating a common extended information frame by determining for each of said bits in a particular position a bit which is common to a majority of said extended information frames and selecting said common bit for said common extended information frame;

if no bit is determined to be common to a majority of said extended information frames, generating a first cumulative by summing said quality metrics for a first set of bits, generating a second cumulative by summing said quality metrics for a second set of bits, comparing said first cumulative to said second cumulative and selecting a bit from said set of bits corresponding to a larger of the two cumulatives;

determining if said common extended information frame includes a valid information frame; and if said common extended information frame is determined to include a valid information frame, forwarding said valid information frame to said remainder of said network.

20. The method for improving performance of soft hand-off according to claim 19 wherein said remainder of said network includes another RCC.

21. The method for improving performance of soft hand-off according to claim 19 wherein if said common extended information frame is determined to include an invalid information frame, forwarding one of an invalid frame indicated as such, and a control frame indicating an invalid frame was received, to said remainder of said network.

22. The method for improving performance of soft hand-off according to claim 21 wherein said remainder of said network includes another RCC.

23. The method for improving performance of soft hand-off according to claim 15 wherein:

said transmission frames include decoded information frames which include a plurality of data bits in particular positions;

said at least two base stations includes only two base stations; and said additional information from each BTS includes a validity check including decoded check bits;

said additional processing includes:

creating extended information frames by appending said decoded check bits to said information frames;

performing an exclusive OR function on said extended information frames to combine said extended information frames into an error frame having a plurality of error bursts;

forming a plurality of new extended information frames by:

replacing one of said plurality of error bursts with a corresponding portion of one of said extended information frames and replacing a remainder of said error frame with a corresponding portion of another of said extended information frames;

replacing another of said plurality of error bursts with a corresponding portion of said one of said extended information frames and replacing a remainder of said error frame with a corresponding portion of said another of said extended information frames; and if only one of said new extended information frames is determined to include a valid information frame, forwarding said valid information frame to said remainder of said network;

if a plurality of said new extended information frames is determined to include a valid information frame, forwarding one of a valid information frame, an invalid information frame indicated as such, and a control frame indicating an invalid information frame was received, to said remainder of said network; and if each of said new extended information frames is determined to include an invalid information frame, forwarding one of an invalid frame indicated as such and a control frame indicating an invalid frame was received, to said remainder of said network.

24. The method for improving performance of soft hand-off according to claim 23 wherein said remainder of said network includes another RCC.

25. The method for improving performance of soft hand-off according to claim 23 wherein said forming a plurality of new extended information frames further includes:

replacing a plurality of said plurality of error bursts with a plurality of corresponding portions of said one of said extended information frames and replacing a remainder of said error frame with a corresponding portion of another of said extended information frames;

replacing another plurality of said plurality of error bursts with a corresponding plurality of portions of said one of said extended information frames and replacing a remainder of said error frame with a corresponding portion of said another of said extended information frames.

26. The method for improving performance of soft hand-off according to claim 15 wherein:

a combination of said transmission frame, said additional information and said indicator from one of said BTSs provides said RCC with a soft-decision information frame, wherein said soft-decision information frames include a plurality of bits; and said additional processing includes:

forming a weighted soft-decision information frame by taking a weighted sum of said soft-decision information frames from each of said BTSs for each of said bits, wherein said weighting is based upon said quality metrics associated with said transmission frames respectively;

decoding said weighted soft-decision information frame by decoding said weighted summed bits using hard decision decoding;

determining if said decoded weighted soft-decision information frame includes a valid information frame;

if said decoded weighted soft-decision information frame is determined to include a valid information frame, forwarding said valid information frame to said remainder of said network; and if said decoded weighted soft-decision information frame is determined to include an invalid information frame, forwarding one of an invalid information frame indicated as such and a control frame indicating an invalid information frame was received, to said remainder of said network.

27. The method for improving performance of soft handoff according to claim 26 wherein said remainder of said network includes another RCC.

28. The method for improving performance of soft handoff according to claim 15 wherein:
  a combination of said transmission frame, said additional information and said indicator from one of said BTSs provides said RCC with a soft-decision frame, wherein said soft-decision frames include a plurality of bits; and
  said additional processing includes:
    forming a weighted soft-decision information frame by taking a weighted sum of said soft-decision frames for each of said bits, wherein said weighting is based upon said quality metrics associated with said information frames respectively;
    decoding said weighted soft-decision frame by decoding said weighted summed bits;
    determining if said decoded weighted soft-decision frame includes a valid information frame;
    if said decoded weighted soft-decision frame is determined to include a valid information frame, forwarding said valid information frame to said remainder of said network; and
    if said decoded weighted soft-decision frame is determined to include an invalid information frame, forwarding one of an invalid information frame indicated as such and a control frame indicating an invalid information frame was received, to said remainder of said network.

29. The method for improving performance of soft handoff according to claim 28 wherein said remainder of said network includes another RCC.

30. The method for improving performance of soft handoff according to claim 15 wherein:
  a combination of said transmission frame, said additional information and said indicator from one of said BTSs provides said RCC with a hard decision frame, wherein said hard decision frames include a plurality of bits; and
  said additional processing includes:
    constructing at least one new coded information frames by interleaving sets of a plurality of said hard decision frames;
    Chase decoding each of said at least one new coded information frames and respectively determining if each of said at least one new coded information frames decodes to a valid information frame;
    if only one of said at least one new coded information frames is determined to decode to a valid information frame, forwarding said valid information frame to said remainder of said network;
    if a plurality of said new coded information frames are determined to decode to a valid information frame, forwarding one of a valid information frame, an invalid information frame indicated as such, and a control frame indicating an invalid information frame was received, to said remainder of said network; and
    if each of said new coded information frames is determined to decode to an invalid information frame, forwarding one of an invalid frame indicated as such and a control frame indicating an invalid frame was received, to said remainder of said network.

31. The method for improving performance of soft handoff according to claim 30 wherein said remainder of said network includes another RCC.

32. The method for improving performance of soft handoff according to claim 15 wherein:
  a combination of said transmission frame, said additional information and said indicator from one of said BTSs provides said RCC with a soft-decision frame; wherein said soft-decision frames include a plurality of bits; and
  said additional processing includes:
    constructing at least one new coded information frames by interleaving sets of a plurality of said soft-decision frames;
    Chase decoding each of said at least one new coded information frame and respectively determining if each of said at least one new coded information frame decodes to a valid information frame;
    if only one of said at least one new coded information frames is determined to decode to a valid information frame, forwarding said valid information frame to said remainder of said network;
    if a plurality of said at least one new coded information frames is determined to decode to a valid information frame, forwarding one of a valid information frame, an invalid information frame indicated as such, and a control frame indicating an invalid information frame was received, to said remainder of said network; and
    if each of said at least one new coded information frames is determined to decode to an invalid information frame, forwarding one of an invalid frame indicated as such and a control frame indicating an invalid frame was received, to said remainder of said network.

33. The method for improving performance of soft handoff according to claim 32 wherein said remainder of said network includes another RCC.

34. A method for improving performance of soft handoff in a telecommunications system having a plurality of base stations and a mobile unit in handoff communication (uplink only or in both uplink and downlink) with at least two of the base stations over at least first and second respective communications links, the first and second communications links each comprising at least one base station transceiver subsystem (BTS), which includes a baseband processor, a de-interleaver, and a decoder, for receiving and processing data from the mobile unit and transmitting information to at least one radio connection controller (RCC) which receives transmissions from the at least two of the base stations and determining if any valid information frame is received, and a network for receiving and processing information frames from the RCC, the handoff method comprising:
  said decoder attempting to detect and correct errors in said data, based upon a plurality of soft-decision estimates;
  determining if an output from said decoder is a valid information frame;
  if it is determined that said output from said decoder is not a valid information frame, said respective BTSs transmitting to said RCC, an input from said baseband processor, one or more variables representing a state of said baseband processor and a quality metric for said information frame;
  if it is determined that said output from one of said decoders includes a valid information frame, said respective BTS transmitting said valid information frame to said RCC;
  said RCC receiving said transmission from said BTSs;
  said RCC determining if one or more of said transmissions includes a valid information frame;
  if at least one of said transmission frames includes a valid information frame, said RCC transmitting one of said valid information frames to a remainder of said network;

if none of said transmission frames include a valid information frame, said RCC combines an input to said baseband processor in each of said BTSs and implements functions of a baseband processor, a de-interleaver and a decoder in an attempt to recover said information frame;

if said recovered information frame is determined to be a valid information frame, said RCC forwarding said valid recovered information frame to a remainder of said network; and if said recovered data frame is determined to be an invalid information frame, said RCC forwarding one of an invalid information frame indicated as such and a control frame indicating an invalid information frame was received, to said remainder of said network.

35. The method for improving performance of soft handoff according to claim 34 wherein said remainder of said network includes another RCC.

36. A method for improving performance of soft handoff in a telecommunications system having a plurality of base stations and a mobile unit in handoff communication (uplink only or in both uplink and downlink) with at least two of the base stations over at least first and second respective communications links, the first and second communications links each comprising at least one base station transceiver subsystem (BTS) for receiving and processing data from the mobile unit and transmitting information to at least one radio connection controller (RCC) which receives transmissions from the at least two of the base stations and determining if any valid frame is received, and a network for receiving and processing information frames from the RCC, the handoff method comprising:

said RCC receiving a decoded information frame and a quality metric from each of said BTSs;

said RCC determining if at least one of said decoded information frames is a valid information frame;

if all of said decoded information frames are determined to be invalid, said RCC transmitting a request to said BTSs for additional information.

37. The method for improving soft handoff according to claim 36 wherein said RCC further received a validity check with said decoded information frame and said quality metric.

38. The method for improving soft handoff according to claim 37 wherein said validity check is a CRC.

39. The method for improving soft handoff according to claim 37 wherein said validity check is a check sum.

40. The method for improving soft handoff according to claim 36 wherein said additional information includes a soft-decision information frame based upon a soft decision estimate of said received decoded frame.

41. The method for improving soft handoff according to claim 36 wherein said additional information includes information enabling said RCC to reconstruct a soft-decision information frame.

42. The method for improving soft handoff according to claim 36 wherein said additional information includes a soft-decision frame based upon a soft-decision input to a channel decoder in said BTS.

43. The method for improving soft handoff according to claim 36 wherein said additional information includes a hard decision frame based upon a soft-decision input to a channel decoder in said BTS.

44. The method for improving soft handoff according to claim 36 wherein said decoded frame includes a baseband frame and variables defining a state of a baseband processor.

45. A base station including a base station transceiver subsystem (BTS), for improving performance of soft handoff (uplink only or in both uplink and downlink) in a telecommunications system, comprising:

receiver means for receiving an information frame from a mobile unit, decoder means coupled to said receiver means for decoding said information frame and determining if said decoded information frame is valid;

generator means for generating a quality metric for said decoded information frame; and transmitter means for transmitting a transmission frame including said quality metric, an additional amount of information and an indication of said additional information for receipt by a radio connection controller (RCC).

46. The base station according to claim 45 wherein:

said transmission frame includes said decoded information frame;

said additional amount of information includes no information; and said indication is an indication that no additional information is being transmitted.

47. The base station according to claim 45 wherein:

said additional information includes a validity check.

48. The base station according to claim 45 wherein:

said transmission frame includes a soft-decision information frame; and said additional information includes an indication to said RCC that said transmission frame includes said soft-decision information frame.

49. The base station according to claim 45 wherein:

said transmission frame includes said decoded information frame; and said additional information includes a soft-decision information frame.

50. The base station according to claim 45 wherein:

said transmission frame includes said decoded information frame; and said additional information includes information for enabling said RCC to reconstruct a soft-decision information frame.

51. The base station according to claim 45 wherein:

said transmission frame includes a soft-decision frame; and said additional information includes an indication to said RCC that said transmission frame includes said soft-decision frame.

52. The base station according to claim 45 wherein:

said transmission frame includes said decoded information frame; and said additional information includes a soft-decision frame.

53. The base station according to claim 45 wherein:

said transmission frame includes a hard decision frame; and said additional information includes an indication to said RCC that said transmission frame includes said hard decision information frame.

54. The base station according to claim 45 wherein:

said transmission frame includes said decoded information frame; and said additional information includes a hard-decision frame.

55. The base station according to claim 45 wherein:
said base station further includes a baseband processor coupled to said receiver means and having a plurality of states; and
said transmission frame includes a baseband frame and variables defining a state of said baseband processor; and
said additional information includes an indication to said RCC that said transmission frame includes said baseband frame and variables defining said state of said baseband processor.

56. The base station according to claim 45 wherein:
said base station further includes a baseband processor coupled to said receiver means and having a plurality of states;
said transmission frame includes said decoded information frame; and
said additional information includes a baseband frame and variables defining a state of said baseband processor.

57. A radio connection controller (RCC) for improving performance of soft handoff in a telecommunications system having a plurality of base stations and a mobile unit in handoff communication (uplink only or in both uplink and downlink) with at least two of the base stations, said RCC comprising;
receiver means for receiving a transmission frame including a quality metric, an additional amount of information and an indication of said additional information from each of said at least two base stations;
determination means, coupled to said receiver means, for determining if one or more of said transmission frames includes a valid information frame;
transmission means for transmitting a valid information frame to a remainder of said network if said determination mean determines that at least one of said transmission frames includes a valid information frame;
processing means for performing additional processing if said determination means determines that none of said transmission frames includes a valid information frame.

58. A radio connection controller (RCC) for improving performance of soft handoff in a telecommunications system having a plurality of base stations and a mobile unit in handoff communication (uplink only or in both uplink and downlink) with at least two of the base stations, said RCC comprising;
receiver means for receiving a transmission frame including a quality metric, an additional amount of information and an indication of said additional information from one of said at least two base stations;
transmission means for transmitting said transmission frame including a quality metric, said additional amount of information and said indication of said additional information to another RCC if said RCC determines that said transmission frame does not include a valid information frame and said RCC is unable to reconstruct a valid information frame.

59. The RCC according to claim 57 wherein:
said transmission frames include decoded information frames which include a plurality of data bits in particular positions;
said additional information from each of said BTSs includes a validity check including decoded check bits in particular positions;
said at least two base stations includes at least three base stations; and
said processing means includes:
appending means for creating extended information frames by appending said decoded check bits to said decoded information frames;
generating means for generating a common extended information frame by determining for each of said bits in a particular position a bit which is common to a majority of said extended information frames and selecting said common bit for said common extended information frame;
if no bit is determined to be common to a majority of said extended information frames, said generating means generating said common extended information frame by generating a first cumulative by summing said quality metrics for a first set of bits, generating a second cumulative by summing said quality metrics for a second set of bits, comparing said first cumulative to said second cumulative and selecting a bit from said set of bits corresponding to a larger of the two cumulatives;
wherein said determination means is configured to determine if said common extended information frame includes a valid information frame; and
said transmission means is configured to forward a valid information frame for receipt by a network if said common extended information frame is determined to include said valid information frame.

60. The RCC according to claim 59 wherein:
said transmission means is configured to forward one of an invalid information frame indicated as such, and a control frame indicating an invalid information frame was received, to a network, if said determination means determines said common extended information frame to include an invalid information frame.

61. The RCC according to claim 57 wherein:
said transmission frames include decoded information frames which include a plurality of data bits in particular positions;
said at least two base stations includes only two base stations; and
said additional information includes a validity check including decoded check bits;
said processing means includes:
appending means for creating extended information frames by appending said decoded check bits to said information frames;
means for performing an exclusive OR function configured to function on said extended information frames to combine said extended information frames into an error frame having a plurality of error bursts;
generator means for generating a plurality of new extended information frames by:
replacing one of said plurality of error bursts with a corresponding portion of one of said extended information frames and replacing a remainder of said error frame with a corresponding portion of another of said extended information frames;
replacing another of said plurality of error bursts with a corresponding portion of said one of said extended information frames and replacing a remainder of said error frame with a corresponding portion of said another of said extended information frames;
said determination means configured to determine if at least one of said plurality of new extended information frames includes a valid information frame;

said transmission means configured to forward a valid information frame to a network if said determination means determines that only one of said new extended information frames includes a valid information frame;

said transmission means configured to forward one of a valid information frame, an invalid information frame indicated as such, and a control frame indicating an invalid information frame was received, to said network if said determination means determines that a plurality of said new extended information frames include valid information frames; and said transmission means configured to forward one of an invalid information frame indicated as such and a control frame indication an invalid information frame was received, to said network if said determination means determines that each of said new extended information frames includes an invalid information frame.

62. The RCC according to claim 61 wherein said generator means is further configured to forming a plurality of new extended information frames by:

replacing a plurality of said plurality bursts with a plurality of corresponding portions of said one of said extended information frames and replacing a remainder of said error frame with a corresponding portion of another of said extended information frames;

replacing another plurality of said plurality of error bursts with a corresponding plurality of portions of said one of said extended information frames and replacing a remainder of said error frame with a corresponding portion of said another of said extended information frames.

63. The RCC according to claim 57 wherein:

said RCC being capable of reconstructing a soft-decision information frame based upon said transmission frame, said additional information and said indicator;

said soft-decision information frames include a plurality of bits; and said processing means includes:
generating means for generating a weighted soft-decision information frame by taking a weighted sum of said soft-decision information frames for each of said bits, wherein said weighting is based upon said quality metrics associated with said transmission frames respectively;

decoding means for decoding said weighted soft-decision information frame by decoding said weighted summed bits using hard decision decoding;

said determination means is configured to determine if said decoded weighted soft-decision information frame includes a valid information frame;

said transmission means being configured to forward said valid new information frame to a network, if said determination means determines that said decoded weighted soft-decision information frame includes a valid information frame, said transmission means being configured to forward one of an invalid information frame indicated as such and a control frame indicating an invalid information frame was received, to said network, if said determination means determines that said decoded weighted soft-decision information frame includes an invalid information frame.

64. The RCC according to claim 57 wherein:

said RCC being capable of reconstructing a soft-decision frame based upon a combination of said transmission frame, said additional information and said indicator;

said soft-decision frames include a plurality of bits;

said processing means includes:
generating means for generating a weighted soft-decision information frame by taking a weighted sum of said soft-decision frames for each of said bits, wherein said weighting is based upon said quality metrics associated with said transmission frames respectively;

decoding means coupled to said generating means for decoding said weighted soft-decision frame by decoding said weighted summed bits;

said determination means being configured to determine if said decoded weighted soft-decision frame includes a valid information frame;

said transmission means being configured to forward said valid new information frame to a network if said determination means determines that said decoded weighted soft-decision frame includes a valid information frame; and said transmission means being configured to forward one of an invalid information frame indicated as such and a control frame indicating an invalid information frame was received, to said network, if said determination means determines that said decoded weighted soft-decision frame includes an invalid information frame.

65. The RCC according to claim 57 wherein:

said RCC being capable of reconstructing a hard decision frame based upon a combination of said transmission frame, said additional information and said indicator;

said hard decision frames include a plurality of bits; and said processing means includes:
generating means for constructing at least one new coded information frame by interleaving sets of a plurality of said hard-decision frames;

Chase decoding means for Chase decoding each of said at least one new coded information frame;

said determination means configured to respectively determine if each of said at least one new coded information frame decodes to a valid information frame;

said transmission means configured to forward said valid information frame to a network if said determination determines that only one of said at least one new coded information frames decodes to a valid information frame;

said transmission means configured to forward one of a valid information frame, an invalid information frame indicated as such, and a control frame indicating an invalid information frame was received, to said network, if a plurality of said at least one new coded information frames is determined to decode to a valid information frame; and said transmission means configured to forward one of an invalid frame indicated as such and a control frame indicating an invalid frame was received, to said network, if each of said at least one new coded information frames is determined to decode to an invalid information frame.

66. The RCC according to claim 57 wherein:

said RCC being capable of reconstructing a soft-decision frame based upon a combination of said transmission frame, said additional information and said indicator;

said soft-decision frames include a plurality of bits; and said processing means includes:
generating means for constructing at least one new coded information frame by interleaving sets of a plurality of said soft-decision frames;

Chase decoding means for Chase decoding each of said at least one new coded information frame;

said determination means configured to respectively determine if each of said at least one new coded information frames decodes to a valid information frame;

said transmission means configured to forward a valid information frame to a network if said determination means determines that only one of said at least one new coded information frames includes a valid information frame;

said transmission means configured to forward one of a valid information frame, an invalid information frame indicated as such, and a control frame indicating an invalid information frame was received, to said network, if a plurality of said at least one new coded information frames is determined to decode to a valid information frame; and said transmission means configured to forward one of an invalid frame indicated as such and a control frame indicating an invalid frame was received, to said network, if each of said at least one new coded information frames is determined to decode to an invalid information frame.

67. A radio connection controller (RCC) for improving performance of soft handoff in a telecommunications system having a plurality of base stations and a mobile unit in handoff communication (uplink only or in both uplink and downlink) with at least two of the base stations, said RCC comprising;

receiver means for receiving a decoded information frame and a quality metric from each of said BTSs;

determining means for determining if at least one of said decoded information frames is a valid information frame;

transmission means for transmitting a request to said BTS for additional information if said determining means determines that all of said decoded information frames are invalid information frames.

68. The RCC according to claim 67 wherein said RCC is further configured to receive a validity check with said decoded information frame and said quality metric.

69. The RCC according to claim 67 wherein said request is for a soft-decision information frame.

70. The RCC according to claim 67 wherein said request is for information enabling said RCC to reconstruct a soft-decision information frame.

71. The RCC according to claim 67 wherein said request is for a soft-decision frame.

72. The RCC according to claim 67 wherein said request is for a hard decision frame.

73. The RCC according to claim 67 wherein said request is for a baseband frame and variables defining a state of a baseband processor.

* * * * *